Oct. 4, 1966  L. J. SMITH, JR  3,276,151
EDUCATIONAL APPARATUS
Filed April 2, 1964

INVENTOR.
LUKE J. SMITH, JR.
BY Kenwood Ross
ATTORNEY.

United States Patent Office 3,276,151
Patented Oct. 4, 1966

3,276,151
EDUCATIONAL APPARATUS
Luke J. Smith, Jr., East Longmeadow, Mass., assignor to Milton Bradley Company, Springfield, Mass.
Filed Apr. 2, 1964, Ser. No. 356,752
5 Claims. (Cl. 35—31)

The present invention generally relates to an educational device and more particularly to such a device for teaching children the processes of arithmetic.

It is a primary object of the present invention to provide novel means for effectuating a clear, easily understood method for use in conjunction with presenting the fundamental ideas of mathematics to children of varying ages, whereby they are able to visualize such ideas as counting, the operations, numbers between numbers, rounding, and the relation between positive integers and their opposites, negative integers. Additionally, the device and method of the invention can be used to provide concrete experience with many of the properties of our number system.

Before the teacher can generalize in arithmetic, it is essential that his pupils be given a rich background of concrete experiences which make the generalizations seem reasonable and lead the pupils to discover the ideas for themselves. It has been found that such type of discovery activity not only increases idea retention but also helps the pupil to apply the ideas correctly. The device hereof, which may be briefly described as a number line, is an excellent tool for providing concrete experience in a geometric context which can easily be visualized.

In the art of teaching, visual aids or educational devices are of value and importance. However, few of the educational devices of the prior art have been widely accepted or successfully employed by members of the teaching profession. Most of the devices proposed have been complicated in structure, difficult to assemble, and relatively expensive in their manufacture.

It is, accordingly, a salient object of the present invention to provide an educational device which is compact in size and neat in appearance, and one which is sturdy in construction and simple in structure and which may be manufactured in quantity at reasonable cost and which is highly effective in action.

A further object of the invention is to provide an educational device which will invite interest in a child, which will attract a child by the use of colors, and which lends itself to use either in school or at home with the assistance of teachers or parents.

The present invention relates, broadly classified, to educational appliances and devices and has references, more particularly construed, to a portable device which is expressly, but not necessarily, adapted for use in a classroom to assist a teacher or an instructor to familiarize students with the purpose and use and processes of mathematics.

Teachers may make use of the number line thereof to show the sum of same-size jumps from point to point.

The number line hereof teaches the novice considerable that there is to know about fractions. For example, he may be taught that when he takes three of four segments and divides their sum into thirds, two of these thirds make one-half of the full unit. He thus has visible proof of the otherwise abstruse fact that ⅔ times ¾ equals ½. By extending the number line leftwardly beyond a zero point, he may be taught to visualize the concept of negative numbers.

The foregoing and other objects and advantages of the invention will be more fully apparent from the following description, when read in conjunction with the annexed drawing, in which.

Figure 1:
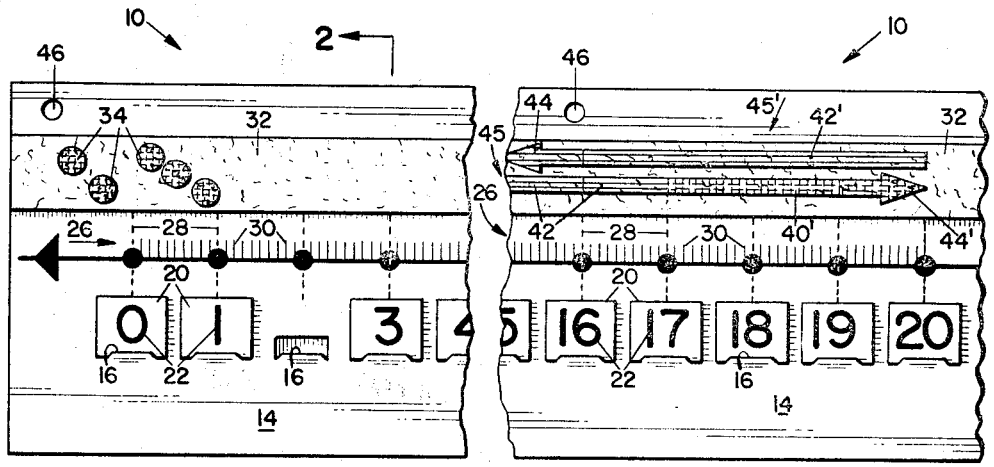
FIG. 1 is a broken and fragmentary plan view of the number line device of the invention.
Figure 5:
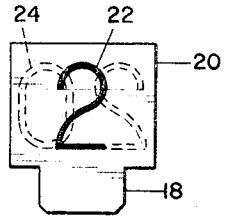
FIG. 5 is an enlarged plan view of another of the number tabs of the invention.
Figure 2:
FIG. 2 is a sectional view taken on the line 2—2 of FIG. 1.
Figure 3:
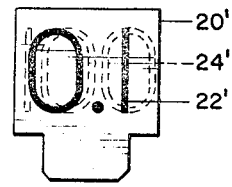
FIG. 3 is an enlarged plan view of one of the number tabs of the invention.
Figure 6:
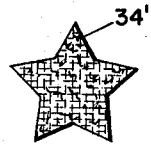
FIGS. 6 and 7 are slightly enlarged plan views of certain of the object pieces of the invention.
Figure 7:
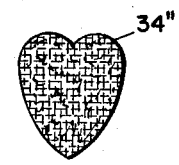

Referring in greater detail to the drawing, numeral 10 generally designates a number line device incorporating the novel features of the invention, which is constituted by a base 12 which may be rectangular or square or other configuration and which will preferably, though not obligatorily, be fabricated from a suitable light weight material such as heavy stock bristol board or the like, having a surface covering material 14 of heavy stock paper or the like fixed upon its forward or outwardly facing face by an suitable means. The surface covering material will be suitably calendered or finished to accept printing or other indicia thereon, for purposes to appear and will be provided with a row of equally-spaced, longitudinally-extending, axially-aligned slots or pockets 16 therein each adapted slideably to receive a depending tail portion 18 of a number tab 20 therein. Alternatively, the unit could be formed in one piece, with one surface calendered or finished, and with the slots or pockets extending completely therethrough.

Each of the tabs 20 will carry a numeral 22 of a value between 0 and 20 on one side face thereof, and will carry a numeral 24 on the opposite side face thereof, each numeral 24 having a value ten times that of numeral 22 on the opposite side face, for purposes to appear.

Another set of number tabs 20′ will carry decimal values 22′ of 0.0, 0.1 etc. through 2.0 on one side face thereof, and will carry decimal values 24′ of 0.00, 0.01 etc., through 0.20 on the opposite side face thereof.

Additional sets of number tabs, not shown, may be used to show positive integers (i.e. +10), and negative integers (i.e. −10).

A graduated scale or number line, generally indicated by 26, is printed or otherwise delineated on surface covering 14 immediately above and parallel to the row of slots 16 and the number tabs disposed therein.

Scale 26 will comprise a plurality of equally-spaced major graduations 28 aligned with the vertical central axes of the number tabs, and a plurality of equally-spaced minor graduations 30 defining ten spaces between each of the major graduations 28.

Spaced immediately above scale 26 and extending in parallel relation thereto is a strip 32 of flannel or flock or like material, said strip being secured to the forwardly facing face of surface covering 14 by any suitable means.

Strip 32 is adapted to releasably hold one or more of a plurality of brightly colored object pieces of felt, flannel or flocked material, such as a plurality of discs 34, or stars 34′ or hearts 34″. Any fanciful or geometric shape may be used, as may flannel object pieces cut to represent animals, birds or human figures, to attract and hold a child's attention. In the drawing, the felt object pieces have been coded to indicate the color yellow although other colors may be used without departing from the scope of the invention.

A plurality of brightly-colored, generally rectangular, bar-like segments of various lengths, also fabricated from felt, flannel or flocked material, are provided and may be releasably engaged with flannel strip 32. The segments will be of a length to correspond to the spacing between one or two or more of the number tabs 20 and major graduations 30 on number line 26.

As an alternative form of construction, not shown, the strip 32 could be metallic and the object pieces and segments magnetized so as to be releasably mountable thereon.

Figure 4:
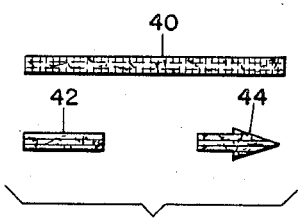
FIG. 4 is an exploded plan view of certain of the line segments of the invention.

In FIG. 4, I have shown such a segment 40 coded to indicate the color yellow and of a length equal to the distance between four major graduations 28 on number line 26, and also such a segment 42 coded to indicate the color blue and of a length equal to the distance between two major graduations 28 on scale 26. There is additionally shown an arrowhead 44, also coded to indicate the color blue and of a length equal to the distance between two major graduations 28 on scale 26. Segments of various lengths, such as the segments 40 and 42, along with the arrowhead 44 will be used in combination to form a directed line segment to show the relationship between segments and numbers, as will appear.

In FIG. 1, I have shown two blue segments 42 each one unit in length combined with a yellow segment 40' two units in length and a yellow arrowhead 44' one unit in length to delineate a directed line segment, generally indicated by 45, five units in length. Immediately thereabove, I have shown a directed line segment generally indicated by 45' and five units in length comprised of a blue segment 42' four units in length and a blue arrowhead 44 one unit in length.

The number line device 10 may be conveniently suspended from the frame of a blackboard or the like (not shown), suitable openings 46 being provided therein for such purpose.

The construction of my device having been set forth, its manner of use will now be described.

Teaching cardinal numbers

The set of number tabs 20 is the set of all whole numbers plus zero. Counting can be described as the matching of the members of a set in any order with the counting numbers beginning with 1. This matching of exactly one member of the set with exactly one counting number is called a one-to-one correspondence. The number which indicates the number of members in a set is called the cardinal number of the set.

The tabs bearing the numerals 0 through 20 are placed in the pockets 16 below the scale or number line 26. A set of discs 34 or other object pieces are placed on the flannel strip 32 in a random manner as shown in FIG. 1, five discs being shown.

A pupil is asked to come forward to match the discs with the numbers by pointing to a disc and then pointing to the numeral 1, pointing to another disc and pointing to the numeral 2, and so on. The teacher may ask how many discs there are and mention that since 5 tells how many discs are in the set that 5 is called the cardinal number of this set.

Other pupils may be called on to match the discs or other object pieces with the numbers using different matchings of the discs with the numbers 1 through 5. Each time the pupil may be asked to state the cardinal number of the set. Such activity may be repeated with other sets of discs.

Teaching ordinal numbers

Ordinal numbers are used to indicate a definite order among the members of a set. The last named ordinal number is also the cardinal number of the set. For example, five of the discs 34 or other object pieces may be placed in a row on the flannel strip 32. The teacher may now say first, second, and so on, as he points to each disc and then say number one, number two, and so on, as he points to the corresponding number shown on the number tab 20, explaining that these numbers are called ordinal numbers. The teacher may repeat this with several sets of discs in rows or columns. For each set, the pupils may be asked what ordinal number is also the cardinal number of the set.

Using one of the sets of discs, the teacher may give the ordinal name and have the pupils point to the correct disc. He may then point to a disc and have pupils name its ordinal number.

These activities may be repeated with several sets of object pieces until the pupils understand that if the members of a set are thought of in a specified order, then an ordinal name describes the location of a specific member in the set.

Direction for counting numbers

On the number line, the counting numbers are shown from left to right and are evenly spaced therealong. Therefore, a counting number may be thought of as so many units in a specific direction (to the right if the number line is horizontal, and up if the number line is vertical). When performing operations between numbers, it is not always possible to think of a number as so many units from zero. For example, for 2+3, 2 can be thought of as 2 units to the right of zero, but 3 is thought of as 3 units to the right of 2. For this reason, it is helpful if the pupils think of a counting number as a segment pointing to the right, but not necessarily starting at zero.

The pupils may be asked to tell where different numbers are on the number line until they discover that they may think of a number as so many spaces (units) to the right of zero.

A pair of blue segments 42 may be placed end to end on the flannel strip 32 immediately above the number line, one segment extending between 0 and 1, and the other between 1 and 2. A blue arrowhead 44 may be placed at the extreme right-hand end of the second segment 42 so as to extend between 2 and 3. The students may now be asked what the arrow represents. The instructor may point to the arrow and explain that this is called a directed line segment because it points in a specific direction and has a specific length. The pupils may be asked to show directed line segments for other numbers.

The number tabs 20 may be removed, and a directed line segment three units long shown any place above the number line. The pupils may be asked to tell how long the segment is and in which direction it is pointing, or they may be asked what number they think this directed line segment shows. The segment may be placed at other locations above the number line and the pupils asked to answer the same questions. This process may be repeated with directed line segments for other numbers, or the teacher may name numbers and have the pupils show directed line segments for them.

These activities may be repeated until the class discovers that for a specific number they may show a directed line segment that many units long and pointing to the right, but not necessarily starting from zero.

Teaching addition

When thinking about adding whole numbers using a number line, it is possible to think of addition as moving to the right. Another plan is to use the idea that a whole number means move to the right so many units; thus, addition can be thought of as meaning move in the direction indicated by the second addend.

For example, a set of 2 discs 34 and a set of 3 discs 34 is placed on the flannel strip above the number line. The pupils are asked to discover the number of discs in both sets using the counting process of matching discs with counting numbers.

The teacher now writes 2+3=△ on the blackboard and places the blue line segments 42 for 2 in the interval from 0 to 2 on the flannel strip. Then he places a yellow line segment 40' and a yellow arrowhead 44' for 3 from 2 to 5 on the flannel strip and runs his finger along the segments and arrowhead and asks what is shown. He may then write the fact 2+3=5 on the blackboard.

The teacher may use similar activities to introduce each of the addition facts.

*Teaching commutative property for addition*

This property states that two numbers may be added in either order without changing the sum. For example, to find the sum of 2 and 3, 2 may be added to 3 or 3 to 2. That is, $2+3=3+2$. For example, the teacher may write $2+3=\square$ on the board, and use blue line segments 42 for 2 (0 to 2) and a yellow line segment 40' and arrowhead 44' for 3 (2 to 5) and write $2+3=5$ on the board.

Next he writes $3+2=\square$ on the board and uses the yellow line segment 40 for 3 and a blue line segment 42 and arrowhead 44 for 2 and writes $3+2=5$ on the board.

The teacher may repeat these activities with other pairs of addends until the pupils have discovered the commutative property for addition.

*Teaching subtraction*

Just as addition is thought of as meaning movement in the direction indicated by the second addend, subtraction can be thought of as first moving in the direction indicated by the first number shown in the expression and then moving in the direction opposite to that indicated by the second number.

Four of the blue segments 40 and a blue arrowhead 44 may be placed on the flannel strip to show a directed line segment for 5 from 0 to 5. Starting at 5 and moving to the left, the teacher may place a yellow segment or segments and a yellow arrowhead 44' in the interval 3 to 2 immediately above the directed line segment 0 to 5 and may place a blue segment in the interval 2 to 0. Pointing to the directed line segment from 5 to 2 and then to the blue segment from 0 to 2 he may ask, "If we take 3 from 5, what is left?"

The teacher may write $5-3=2$ on the board and, pointing to the 3 in the subtraction example, may tell the class that 3 ordinarily means move three units to the right. The teacher may ask "In what direction did we move for this 3?" and remind the class that addition means go in the same direction, and that subtraction means go in the opposite direction.

*Teaching addends-sum relationship*

A study of the addends-sum relationship will lead pupils to discover that for each addition fact there is a related addition fact and two related subtraction facts. For example, if a pupil knows the addends-sum relationship $2+3=5$, he will soon discover that he also knows $3+2=5$, $5-3=2$, and $5-2=3$.

As step 1, the teacher writes $2+3=\square$ on the board and shows in blue the directed line segment for 2 (0 to 2) and in yellow the directed line segment for 3 (2 to 5). He writes $2+3=5$ on the board.

As step 2, the teacher writes $$3 + 2 = \left\langle \phantom{xxx} \right\rangle$$

on the board and shows in blue the directed line segment for 3 (0 to 3) and in yellow the directed line segment for 2 (3 to 5). He now writes $3+2=5$ on the board.

As step 3, he writes $5-3=\triangle$ on the board and shows in blue the directed line segment for 5. Now he shows 3 subtracted from 5 by placing yellow segments from 5 to 3 above the blue segments and by placing a yellow arrowhead in the interval from 3 to 2. He now writes $5-3=2$.

He now repeats step 2 for $5-2=\square$.

Now, pointing to the four mathematical sentences obtained from steps 1–4, he asks the pupils to name the addends and the sum in each, leading them to discover that all four of these sentences express the same relationship among the addends 2 and 3 and the sum 5.

The teacher may repeat these activities with other sets of four related addition and subtraction facts, or he may give the pupils one fact from a set and have them show the other three on the number line.

*Teaching multiplication*

On the number line, a multiplication such as $4\times2$ can be thought of as joining 4 segments each 2 units long.

Using alternating colors, the teacher may show four segments for 2, starting with 0 to 2 in blue, then 2 to 4 in yellow, 4 to 6 in blue, and 6 to 7 in yellow and using an arrowhead pointing to the right in the interval 7 to 8. For each segment, he may make comments such as, "Here is 2 and here is another 2," or ask, "How many 2's did we show?", explaining that a way to indicate four two's is $4\times2$, read, four times two.

Writing $4\times2=\triangle$ on the board, he may ask, "What does four two's, or four times two equal?" writing the answer $4\times2=8$ on the board.

*Teaching commutative property for multiplication*

This property states that a pair of numbers may be multiplied in either order. That is $2\times3=3\times2$.

The teacher writes $2\times3=\square$ on the board and uses alternating colors to show 2 segments for 3 using an arrow head pointing to the right at the interval 5 to 6. He now writes $2\times3=6$ on the board.

He now writes $3\times2=\square$ and uses alternating colors to show 3 segments for 2 using an arrow head pointing to the right at the interval 5 to 6. He now writes $3\times2=6$, and asks, "Does $2\times3$ equal $3\times2$?"

The teacher repeats these activities until the pupils discover the commutative property for multiplication.

*Teaching division*

On the number line, the quotient in a division can be thought of as the number of segments each representing the divisor that may be made from the segment for the dividend.

The teacher writes $6\div2=\triangle$ on the board and asks, "How many two's are in six?"

He now shows in blue a directed line segment for 6 and then immediately thereabove he replaces the blue segments from 6 to 4 and 2 to 0 with like yellow segments and asks the pupils to tell how many segments for 2 can be made from a segment for 6 and writes $6\div2=3$ on the board.

Remainders in division can also be shown on the number line. For $7\div2$ there would be three segments for 2 and then a segment 1 unit long showing the remainder.

The numerals 24 on the reverse side of the number tabs 20 may be used to show the infinite set of whole numbers.

Starting with 0, the pupils may be asked to name the numbers 1–20 as they are pointed out on the number line. When the number 20 is reached, the question is asked, "What number is one greater than 20?"

The number tabs are then reversed to expose the numerals 24 and pointing to the numbers 10, 20, 30 and so on, the teacher asks the pupils to name the numbers as he points to them.

When 200 is reached, the pupils are asked to name some numbers which are greater. The teacher may name some very great numbers such as one billion (written with a 1 followed by nine zeros), or one duodecillion (written with a 1 followed by thirty-nine zeros), and ask the pupils to name the number which is one greater.

The minor graduations 30 on the scale may be used to indicate numbers between whole numbers. Thus, pointing to each vertical mark between 0 and 1, for example, the teacher may recite one tenth, two tenths etc., or he may place the number tabs 20' in the slots 16, in which case the major graduations 28 may be used to show tenths, and by reversing the tabs 20', to show hundredths.

The number line device may additionally be utilized to study the idea of rounding. The number line presents this topic with unusual clarity since the concepts are developed in terms of location on the number line rather than depending on the last digit in the numeral. When a number whose last digit is 5 is shown on the number line, it becomes obvious that this number could be rounded either up or down (this would be either to the right or left on the number line).

The number line device may also be used to advantage in graphically portraying the difference between positive and negative integers, in which case number tabs having a + or — sign thereon are employed.

From the foregoing, it will be apparent that my device may be used for teaching a variety of mathematic combinations, so that the pupil can visualize the relationship between line segments and numbers, and vice versa.

I claim:
1. An educational device for presenting fundamental concepts of mathematics comprising, a base, a plurality of equally spaced axially aligned recesses in said base, a plurality of number tabs each having a depending tail portion adapted for engagement in one of said recesses, each of said number tabs bearing numerical indicia thereon, a graduated numberless scale on said base spaced from said recesses and said number tabs and extending in parallel relation thereto, said scale having major graduations corresponding to the spacing between said number tabs, a holding strip spaced from said scale and extending in parallel relation thereto, a plurality of colored members of various sizes, colors and shapes each having means for releasably interlocking with said holding strip, said members when disposed on said holding strip in vertical alignment with said number tabs showing a relationship between the colored members, the major graduations on said scale and the numerical indicia on said number tabs.

2. In an educational device as set forth in claim 1, including a plurality of sets of number tabs, each set bearing numerical indicia indicating whole numbers, decimals and positive and negative integers.

3. In an educational device as set forth in claim 1, wherein said colored members comprise a plurality of object pieces of various shapes and colors, a plurality of flat bars of various lengths and colors and a plurality of arrowheads of various colors, said flat bars and arrowheads corresponding in length to the spacing between at least two of said number tabs and major graduations.

4. In an educational device as set forth in claim 1, wherein said holding strip and said colored members are fabricated from a flocked material.

5. In an educational device as set forth in claim 1 wherein said holding strip is metal and said colored members are magnetized.

References Cited by the Examiner
UNITED STATES PATENTS

| | | | |
|---|---|---|---|
| 533,216 | 1/1895 | Troelltsch | 35—73 |
| 1,405,063 | 1/1922 | Murray | 35—35.8 |
| 2,369,804 | 2/1945 | Schoolfield et al. | 35—35.8 |
| 2,389,394 | 11/1945 | Thomas. | |
| 2,554,408 | 5/1951 | Hile | 35—73 |
| 2,635,360 | 4/1953 | Bishop | 35—73 |
| 2,722,754 | 11/1955 | Slote | 35—73 X |

EUGENE R. CAPOZIO, *Primary Examiner.*

W. H. GRIEB, *Assistant Examiner.*